United States Patent
Chae et al.

(10) Patent No.: US 9,924,341 B2
(45) Date of Patent: Mar. 20, 2018

(54) METHOD AND APPARATUS FOR MAPPING DISCOVERY SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 26 days.

(21) Appl. No.: 14/904,659

(22) PCT Filed: Aug. 5, 2014

(86) PCT No.: PCT/KR2014/007224
§ 371 (c)(1),
(2) Date: Jan. 12, 2016

(87) PCT Pub. No.: WO2015/020400
PCT Pub. Date: Feb. 12, 2015

(65) Prior Publication Data
US 2016/0157082 A1 Jun. 2, 2016

Related U.S. Application Data

(60) Provisional application No. 61/862,509, filed on Aug. 5, 2013.

(51) Int. Cl.
*H04W 8/00* (2009.01)
*H04B 7/26* (2006.01)
*H04L 5/00* (2006.01)
*H04W 72/04* (2009.01)
*H04L 1/00* (2006.01)
*H04W 92/18* (2009.01)

(52) U.S. Cl.
CPC .............. *H04W 8/005* (2013.01); *H04B 7/26* (2013.01); *H04L 5/0048* (2013.01); *H04W 8/00* (2013.01);
(Continued)

(58) Field of Classification Search
CPC ... H04W 8/005; H04W 72/0413; H04W 8/00; H04W 92/18; H04L 5/0048; H04L 1/00; H04B 7/26
See application file for complete search history.

(56) References Cited

U.S. PATENT DOCUMENTS

2010/0202400 A1  8/2010  Richardson et al.
2012/0106495 A1  5/2012  Yang et al.
(Continued)

FOREIGN PATENT DOCUMENTS

CN    102318421    1/2012
JP    2010041125   2/2010
(Continued)

OTHER PUBLICATIONS

European Patent Office Application Serial No. 14834631.5, Search Report dated Mar. 6, 2017, 5 pages.
(Continued)

*Primary Examiner* — Andrew Lai
*Assistant Examiner* — Harry H Kim
(74) *Attorney, Agent, or Firm* — Lee Hong Degerman Kang & Waimey

(57) ABSTRACT

One embodiment of the present invention relates to a method for mapping a discovery signal by a terminal in a wireless communication system, the method for mapping the discovery signal comprising the steps of: generating the discovery signal; mapping the discovery unit on at least a portion of a plurality of discovery signal resource blocks (RB), wherein when the number of terminals transreceiving the discovery signal including the terminal is less than or equal to a predetermined value, an absolute value of a frequency band of a discovery signal RB included in a positive frequency zone with respect to a direct current (DC) carrier, from among the plurality of discovery signal RBs, does not overlap with an absolute value of a frequency band corresponding to a discovery signal RB present in a negative frequency zone.

13 Claims, 9 Drawing Sheets

(52) U.S. Cl.
CPC ........... *H04W 72/0413* (2013.01); *H04L 1/00* (2013.01); *H04W 92/18* (2013.01)

(56) References Cited

U.S. PATENT DOCUMENTS

| | | | |
|---|---|---|---|
| 2012/0269115 A1 | 10/2012 | Esteves et al. | |
| 2014/0242963 A1* | 8/2014 | Novlan | H04W 48/16 455/418 |
| 2016/0374129 A1* | 12/2016 | Saiwai | H04W 48/06 |

FOREIGN PATENT DOCUMENTS

| | | |
|---|---|---|
| JP | 2013521678 | 6/2013 |
| JP | 2013529416 | 7/2013 |
| KR | 10-2013-0040749 | 4/2013 |
| WO | 2012/128505 | 9/2012 |
| WO | 2013030773 | 3/2013 |
| WO | 2013/049959 | 4/2013 |
| WO | 2014010956 | 1/2014 |

OTHER PUBLICATIONS

Huawei, "PHY consideration for discovery signal design", R1-132413, 3GPP TSG RAN WG1 Meeting #73, May 2013, 6 pages.
PCT International Application No. PCT/KR2014/007224, Written Opinion of the International Searching Authority dated Nov. 17, 2014, 15 pages.
State Intellectual Property Office of the People's Republic of China Application Serial No. 201480044596.3, Office Action dated Jan. 10, 2018, 20 pages.

* cited by examiner

FIG. 6
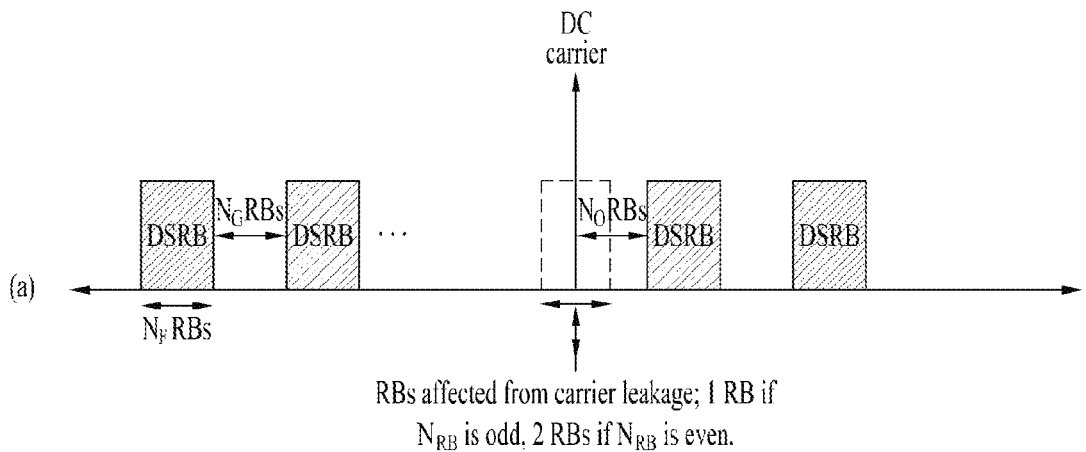
(a) RBs affected from carrier leakage; 1 RB if $N_{RB}$ is odd, 2 RBs if $N_{RB}$ is even.
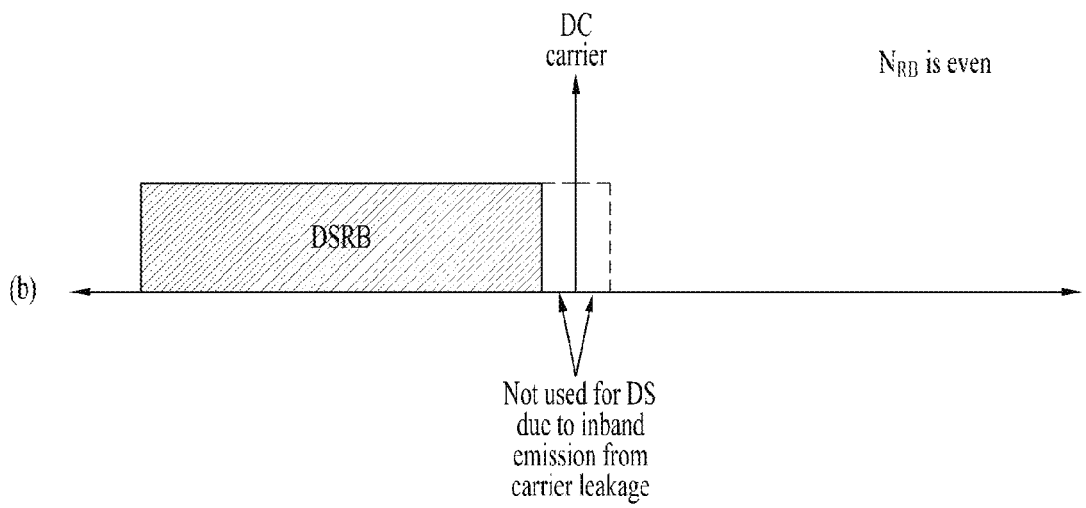
(b) Not used for DS due to inband emission from carrier leakage
$N_{RB}$ is even

METHOD AND APPARATUS FOR MAPPING DISCOVERY SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/007224, filed on Aug. 5, 2014, which claims the benefit of U.S. Provisional Application No. 61/862,509, filed on Aug. 5, 2013, the contents of which are all hereby incorporated by reference herein in their entirety.

TECHNICAL FIELD

The present invention relates to a wireless communication system, and more particularly, to a method and apparatus for generating and mapping a discovery signal in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention devised to solve the problem is to generate a discovery signal, define a structure of the discovery signal, define resources for transmission of the discovery signal, and map the discovery signal in Device-to-Device (D2D) communication.

The objects achieved by the present invention are not limited to the above-described objects and those skilled in the art may consider other objects from the following description of the embodiments of the present invention.

Technical Solution

In an aspect of the present invention, provided herein is a method for mapping a discovery signal by a User Equipment (UE) in a wireless access system. The method includes generating a discovery signal, mapping the discovery signal to a discovery unit, and mapping the discovery unit to at least a part of a plurality of discovery signal Resource Blocks (RBs). If the number of UEs transmitting and receiving discovery signals, including the UE, is equal to or less than a predetermined value, absolute values of frequency bands of discovery signal RBs included in a positive frequency area with respect to a Direct Current (DC) carrier among the plurality of discovery signal RBs are not overlapped with absolute values of frequency bands of discovery signal RBs included in a negative frequency area with respect to the DC carrier among the plurality of discovery signal RBs.

In another aspect of the present invention, a UE in a wireless access system includes a reception module, and a processor. The processor is configured to generate a discovery signal, map the discovery signal to a discovery unit, and map the discovery unit to at least a part of a plurality of discovery signal RBs. If the number of UEs transmitting and receiving discovery signals, including the UE, is equal to or less than a predetermined value, absolute values of frequency bands of discovery signal RBs included in a positive frequency area with respect to a DC carrier among the plurality of discovery signal RBs are not overlapped with absolute values of frequency bands of discovery signal RBs included in a negative frequency area with respect to the DC carrier among the plurality of discovery signal RBs.

The above aspects of the present invention include a part or all of the followings.

If a system bandwidth of the UE has an even number of RBs, the plurality of discovery signal RBs may not include two discovery signal RBs closest to the DC carrier.

If the system bandwidth of the UE has an odd number of RBs, the plurality of discovery signal RBs may not include a discovery signal RB including the DC carrier.

The plurality of discovery signal RBs may not include RBs for Physical Uplink Control Channel (PUCCH) transmission.

The RBs for PUCCH transmission may include an RB to which a PUCCH is mapped and m (m>0) RBs adjacent to the RB to which the PUCCH is mapped.

Two adjacent RBs included in the plurality of discovery signal RBs may be apart from each other by 1 (1>0) RBs.

Each of the plurality of discovery signal RBs may include n (n>0) RBs.

The plurality of discovery signal RBs may exist only in a subframe configured for the UE.

If the number of UEs transmitting and receiving discovery signals, including the UE, is larger than the predetermined value, the overlap may be allowed.

The at least part of the plurality of discovery signal RBs may correspond to one of a plurality of discovery signal RB subsets configured for the UE.

A size of the discovery unit may be changed according to a system bandwidth of the UE.

The size of the discovery unit may be changed only when there are a predetermined number of discovery units in a system bandwidth.

Advantageous Effects

According to the present invention, a discovery signal can be transmitted with minimal effects of various interferences caused by the discovery signal transmission.

The effects of the present invention are not limited to the above-described effects and other effects which are not described herein will be understood by those skilled in the art from the following description of the embodiments of the present invention. That is, unintended effects of the present invention may be also derived by those skilled in the art from the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5 and 6 illustrate discovery signal resource blocks according to an embodiment of the present invention;

BEST MODE

Figure 1:
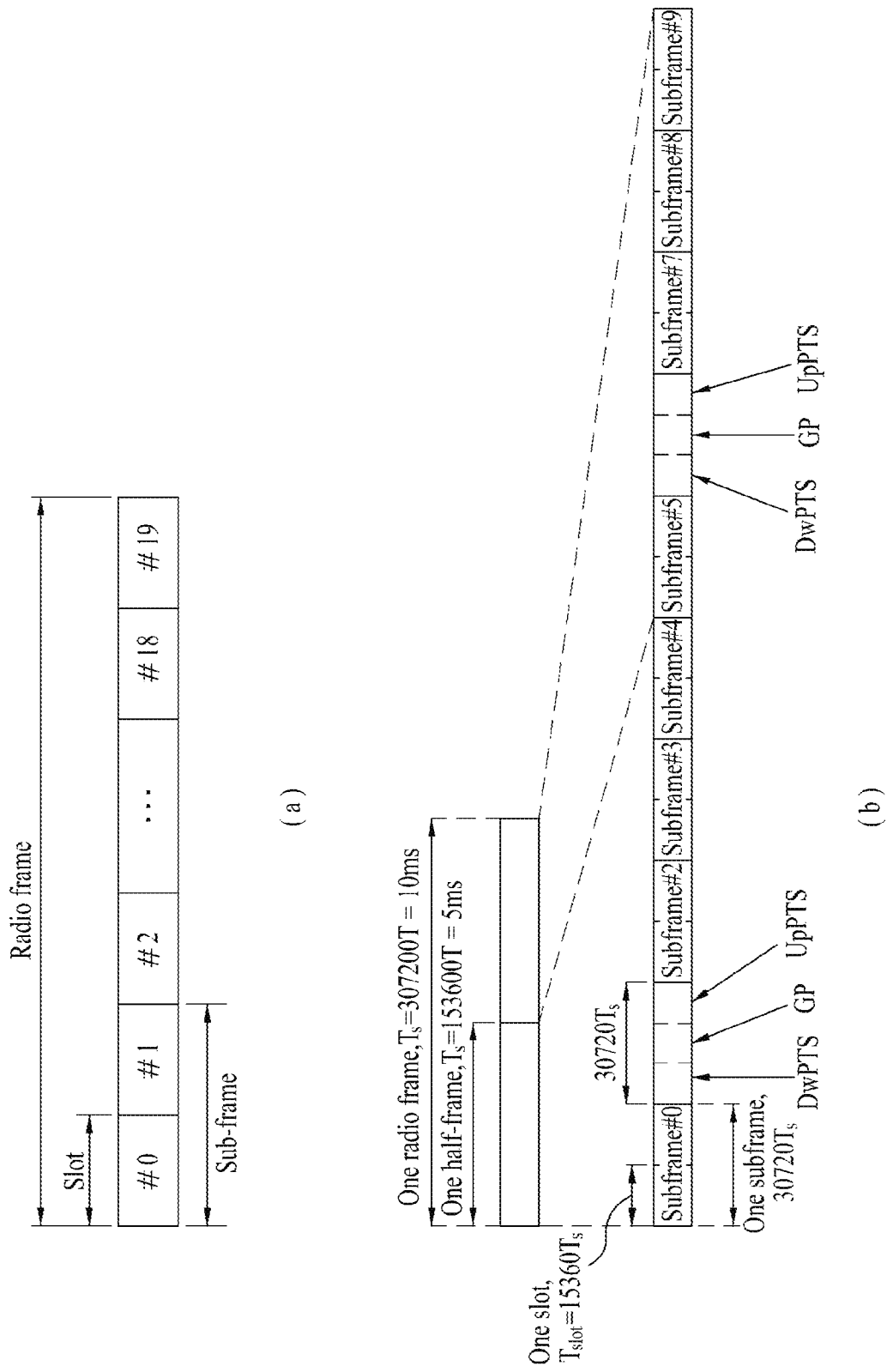
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
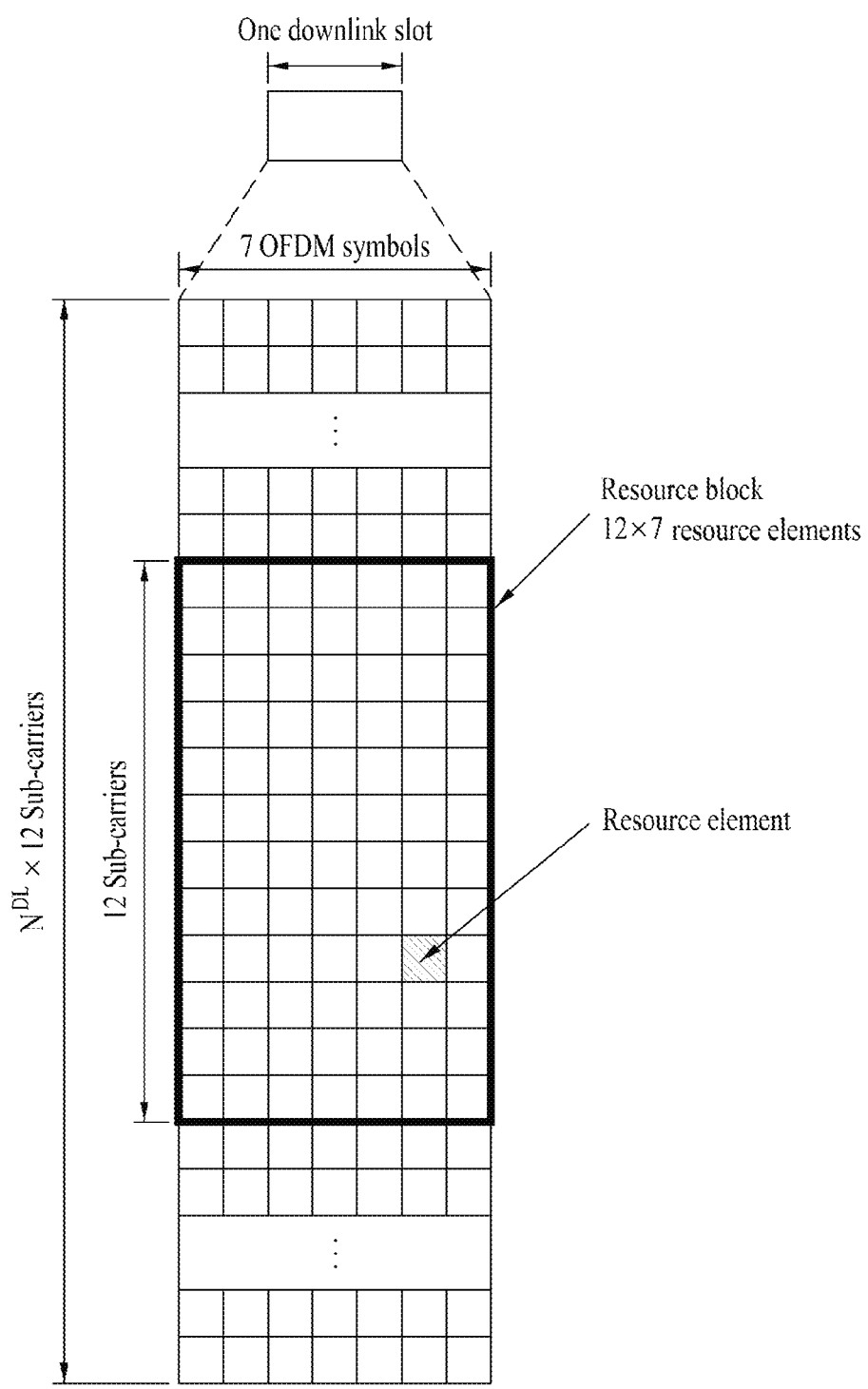
FIG. 2 illustrates a structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
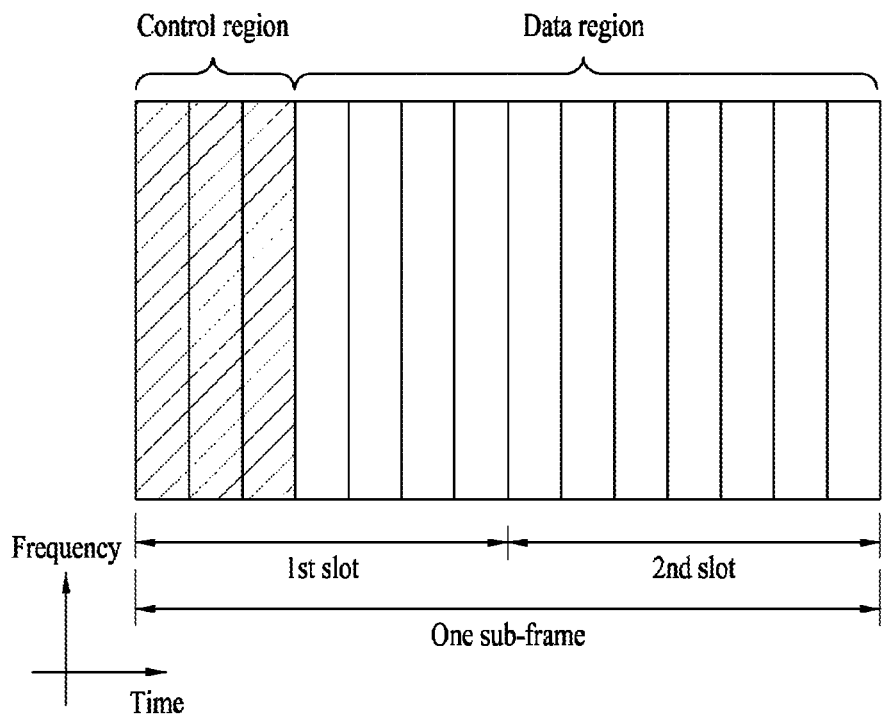
FIG. 3 illustrates a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
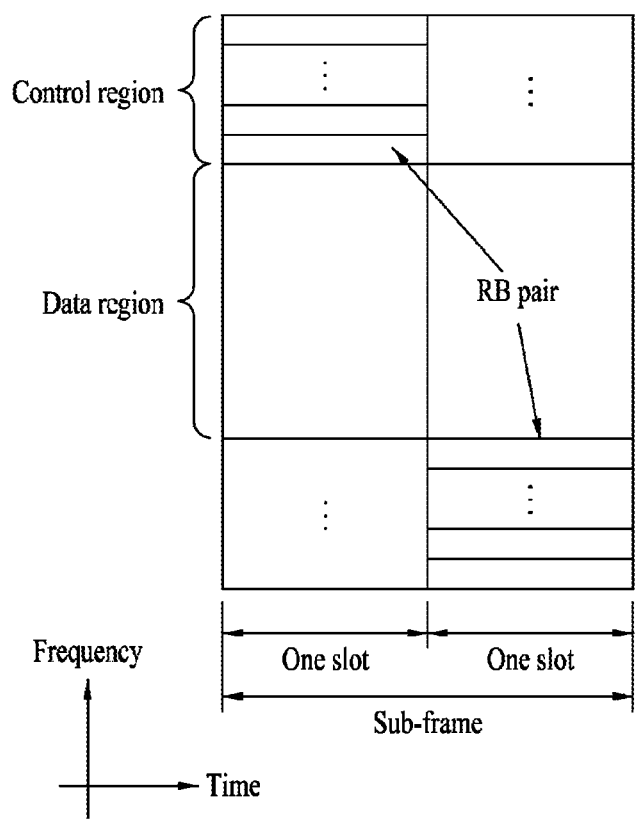
FIG. 4 illustrates a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Now, a description will be given of a resource structure related to Device-to-Device (D2D) communication, particularly, transmission and reception of a Discovery Signal (DS) according to an embodiment of the present invention, based on the above descriptions. A DS refers to a signal used to discover the other party's UE in D2D communication.

However, some of the principle of the present invention is applicable to transmission of a general D2D communication signal, not limited to transmission and reception of a D2D DS.

Discovery Signal Resource Block (DS RB) Configuration

Figure 5:
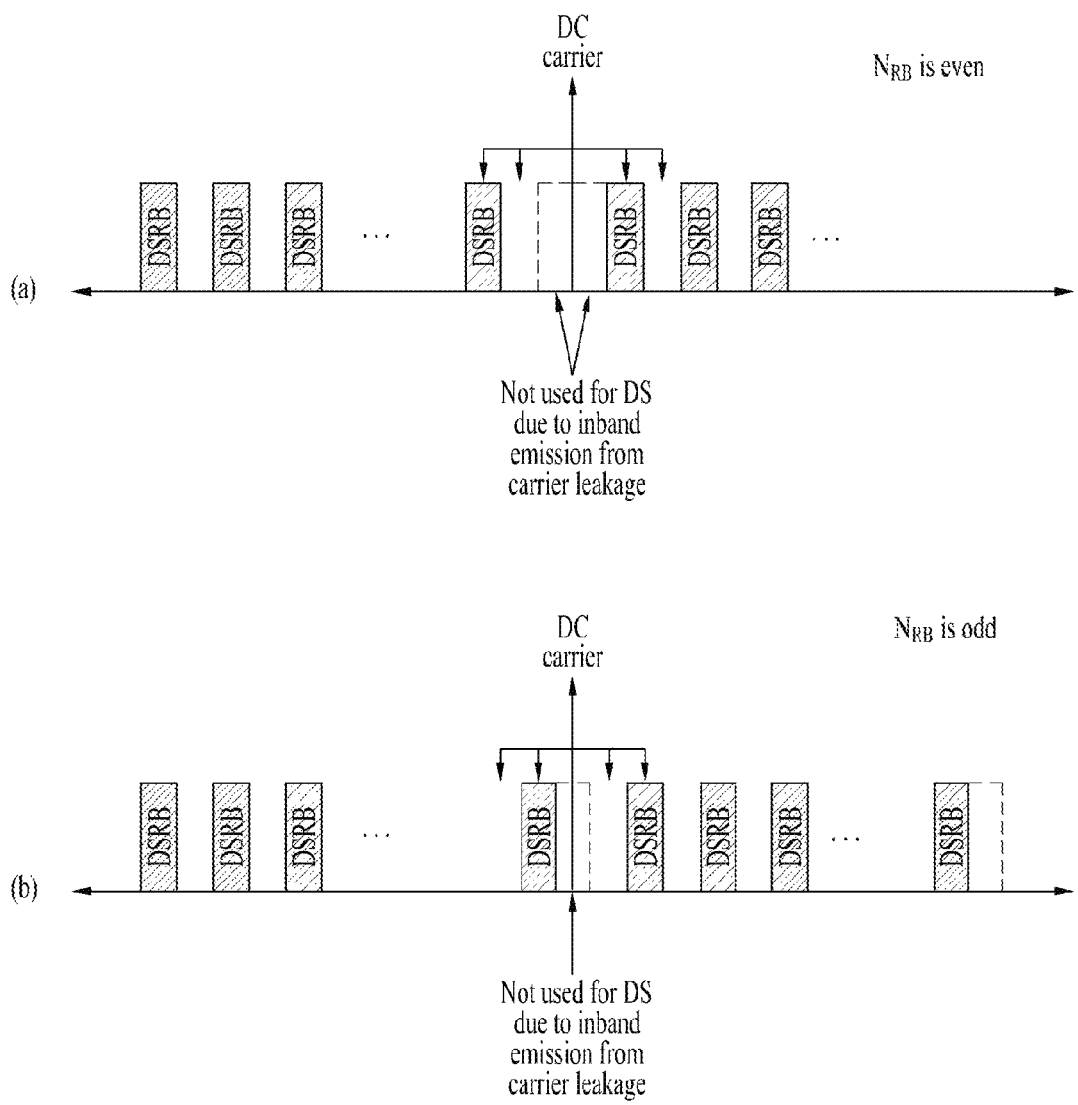

DS RBs (RBs for transmission of a DS) may be configured in such a manner that the effects of interference may be minimized according to an embodiment of the present invention. Specifically, the absolute values of frequency bands of DS RBs included in a right area (a positive frequency area with respect to a Direct Current (DC) carrier) may not be overlapped with the absolute values of frequency bands of DS RBs included in a left area (a negative frequency area with respect to the DC carrier) among a plurality of DS RBs included in a total system bandwidth. That is, the DS RBs may be configured to be asymmetrical with respect to the DC carrier in order to avoid interference caused by an I/Q image. Further, an RB including the DC carrier or RBs close to the DC carrier may be excluded from the DS RBs because the RB including the DC carrier or the RBs close to the DC carrier are very susceptible to severe interference due to carrier leakage. Specific examples are illustrated in FIG. 5. FIG. 5(a) illustrates a case in which a system bandwidth has an even number of RBs. In this case, it is noted that a plurality of DS RBs do not include two DS RBs closest to the DC carrier. It is also noted that as the DS RBs are asymmetrical with respect to the DC carrier, interference caused by an I/Q image is avoided. That is, if DS RBs are configured on the left of the DC carrier in consideration of a guard RB, an offset may be applied so that DS RBs may be configured in a non-image area after the DC carrier. FIG. 5(b) illustrates a case in which a system bandwidth has an odd number of RBs. As illustrated in FIG. 5(b), a plurality of DS RBs do not include an RB including the DC carrier. Each of the plurality of DS RBs may include n RBs (n>0). Particularly in FIG. 5, a DS RB includes one RB.

The plurality of DS RBs may not include RBs for PUCCH transmission. That is, RBs carrying a PUCCH in a legacy cell may be excluded from the DS RBs. The RBs for PUCCH transmission may include RBs to which a PUCCH is mapped and m RBs (m>0) adjacent to the PUCCH-mapped RBs. That is, to mitigate inband emission to the adjacent RBs caused by PUCCH transmission or inband emission to a PUCCH region caused by a DS, RBs adjacent to the PUCCH transmission RBs may be excluded from the DS RBs. Herein, m may be a predetermined value or a value indicated by higher-layer/physical-layer signaling. Or the DS RBs may be determined in consideration of m, when the DS RBs are signaled. The difference from legacy PUSCH transmission lies in that a D2D signal is transmitted in a PUSCH region and some RBs close to a PUCCH are excluded from a D2D transmission region, in order to mitigate inband emission-incurred interference.

In another example, as illustrated in FIG. 6(a), two adjacent RBs included in a plurality of DS RBs may be apart from each other by 1 RBs (1>0) (by $N_G$). This means that as many guard RBs (or guard carriers) as $N_G$ may be configured in consideration of inband emission between DSs (EVM shoulder). The guard RBs may be elements included in the DS RBs, when the DS RBs are configured. For example, if one DS includes $N_F$ RBs, subcarriers/RBs at both ends of each RB or a subcarrier/RB at one end of each RB may be configured as a guard area. To avoid a frequency offset from another UE as well as the EVM shoulder, guard subcarriers may be placed between DSs.

In another example, only the half frequency area on the left (or right) of the DC carrier may be available for DS RBs, as illustrated in FIG. 6(b).

The foregoing methods for configuring DS RBs to reduce interference may be used individually or in combination. For example, RBs used for PUCCH transmission may be excluded from DS RBs in FIG. 5(a) or FIG. 5(b). Also, the above description may be applied differently according to the number of UEs. For example, if the number of UEs transmitting and receiving DSs is equal to or smaller than a predetermined value, the absolute values of frequency bands of DS RBs included in a positive frequency area with respect to the DC carrier may not be overlapped with the absolute values of frequency bands of DS RBs included in a negative frequency area with respect to the DC carrier, among the plurality of DS RBs. On the other hand, if the number of UEs transmitting DSs is larger than the predetermined value, a total band (an area around the DC carrier, affected by carrier leakage, a PUCCH region, etc. may be excluded) may be used for DS RBs. Also, the DS RBs may be managed in subsets. DS RBs used for a UE may correspond to one of a plurality of DS RB subsets configured for the UE. In a specific implementation example, after a plurality of DS RB subsets are configured for UEs by higher-layer signaling, a specific UE or UE group may select and use an appropriate subset. For example, FIG. 5(a) and FIG. 5(b) may be preset as type 1 and type 2, respectively (an RB including a DC carrier or RBs closest to the DC carrier are excluded), and one of the types may be selected for a specific UE/UE group. Or DS RBs may be indicated to a UE/UE group by higher-layer/physical-layer signaling or through a setting. A UE/UE group that has never been out of coverage or has never accessed to a cell may use a predetermined RB (or RB index) for DS transmission.

The above-described DS RBs may exist only in a DS subframe. In other words, a subframe serving the usage of transmitting and receiving a DS may be preset for a specific UE/UE group. Six RBs in the middle of the RBs of a DS subframe may not be used for DS transmission and reception. The six RBs may be used in the case where a UE fails to detect cellular synchronization and thus a subframe boundary is obscure in Time Division Duplexing (TDD). Meanwhile, DS subframes may be set according to a multiple of a UL HARQ period. For example, the HARQ period is 8 ms in Frequency Division Duplexing (FDD) and thus DS subframes may be set according to 'a subframe index being a multiple of 8+offset'. As a consequence, adverse influence on a plurality of HARQ processes may be prevented. Obviously, a specific HARQ process is continuously affected by DS transmission and reception. To overcome this problem, a DS may be configured to be transmitted in an adjacent subframe (e.g., a subframe corresponding to the index of a subframe supposed to carry an HARQ-ACK+1 or a subframe corresponding to the index of a subframe supposed to carry an HARQ-ACK+an HARQ period). DS subframes may be grouped, and a UE may select and use a DS subframe group. Herein, a DS subframe group may include DS subframes with a specific periodicity or n contiguous DS subframes.

A DS may be mapped to the above-described DS RBs. A UE may generate a DS and map the generated DS to discovery units. The discovery units may be mapped to DS RBs. Herein, a discovery unit may be a logical RB mapped to a DS RB being a physical RB, which will be described below.

Discovery Unit

The size of a discovery unit may vary according to a system bandwidth. Or the size of a discovery unit may vary according to the amount of resources configurable for a DS. For example, if the system bandwidth is 5 MHz, a discovery unit may be '3 RBs×4 OFDM symbols', and if the system bandwidth is 10 MHz, a discovery unit may be '6 RBs×2 OFDM symbols'. An RB refers to the size of a frequency area occupied by one RB in the frequency domain, and one RB includes 12 subcarriers. This is a method for fixing the logical structure of a DS area. In other words, the size of a discovery unit may vary under the condition that a system bandwidth includes a predetermined number of discovery units. In this case, even though the system bandwidth is changed, the number of discovery units is kept unchanged in the total system bandwidth. Therefore, the number of discovery signals that may be multiplexed at the same time may be fixed. For example, [Table 1] lists the numbers of RBs available for a DS, except for a PUCCH region, as a system bandwidth increases. If a discovery unit of a fixed size is used, the number of used discovery units may increase with a frequency bandwidth. The increase in the number of discovery units means the increase in the number of DSs/UEs that may be multiplexed simultaneously. In this case, time taken for UEs that have transmitted DSs to discover each other (a worst case discovery delay) may be increased significantly. Accordingly, as the size of a discovery unit is made variable with a system bandwidth as described above, the number of DSs/UEs multiplexed at the same time may be reduced and thus the increase of the worst case discovery delay may be prevented.

TABLE 1

| | BW (MHz) | | | | | |
|---|---|---|---|---|---|---|
| | 1.4 | 3 | 5 | 10 | 15 | 20 |
| # of RBs | 6 | 15 | 25 | 50 | 75 | 100 |
| Typical # of PUCCH regions | 1 | 2 | 4 | 8 | 12 | 16 |
| DS regions excluding PUCCH regions | 5 | 13 | 21 | 42 | 63 | 84 |

Meanwhile, the number of subframes occupied by one discovery group may vary with a system bandwidth. This means that the time-frequency resources of one discovery unit and the number of subframes in a DS group may vary according to a frequency area of resources configured for a DS. In this case, since the same number of DSs are always multiplexed in different frequencies irrespective of the system bandwidth, the worst case discovery delay may be reduced. That is, the worst case discovery delay becomes independent of the system bandwidth.

Or an upper limit for the number of multiplexed DSs may vary with a system bandwidth, instead of fully fixing the logical structure of a DS as described above. This may be implemented as configuring a DS unit by a network. This method reflects a possible lack of the number of RBs that may carry a DS under circumstances. A configuration that defines one discovery unit may be indicated by physical-layer/higher-layer signaling. A UE outside the network may use a predetermined default discovery unit, and a plurality of default discovery units may be preset according to frequency bandwidths.

The number of REs included in a discovery unit may be fixed. For example, it is defined that one discovery unit includes $N_T$ OFDM symbols and $N_F$ RBs. Despite the benefit of using the same demodulation circuit irrespective of a system bandwidth, this configuration may increase the worst case discovery delay. To solve the problem, adjacent UEs may transmit DSs at different time instants. Specifically, a UE may detect energy of a plurality of DS subframes (or decode a DS from another UE and measure the signal strength of the DS) before DS transmission and then transmit a DS in a smallest DS subframe period.

Generation/Structure of DS

Generation/a structure of a DS according to an embodiment of the present invention will be described. A DS described below may be mapped to an afore-described discovery unit/DS RB and transmitted.

If the time resource granularity of a DS is equal to or less than one subframe, a specific UE should receive DSs from other UEs in the remaining OFDM symbols after transmitting a single DS, unless the UE repeats transmitting the DS in the subframe. Therefore, a guard period for Transmission/Reception (Tx/Rx) switching is required. The guard period may be one OFDM symbol, or a decimal multiple of a legacy OFDM symbol length, for efficient use of resources. A transmission symbol as long as or shorter than one OFDM symbol may be generated in the following manner. Let an information symbol vector of length N/a be denoted by X ([Equation 1]) (N is an OFDM symbol length (except for a CP) and a is a factor of N). Then, Os may be inserted between the symbols of the transmission symbol vector and the zero-padded symbol vector may be subjected to Fast Fourier Transform (FFT), as depicted in [Equation 2]. If the zero-padded vector is X', a transmission symbol vector Y may be an a-times repeated signal, as depicted in [Equation 3].

$$X = \begin{bmatrix} x_1 \\ x_2 \\ \vdots \\ x_{\frac{N}{a}} \end{bmatrix} \quad \text{[Equation 1]}$$

$$x' = \begin{bmatrix} x_1 \\ 0_{(a-1)\times 1} \\ x_2 \\ 0_{(a-1)\times 1} \\ \vdots \\ x_{\frac{N}{a}} \\ 0_{(a-1)\times 1} \end{bmatrix} \quad \text{[Equation 2]}$$

$$Y = IFFT(x') = \begin{bmatrix} X \\ \vdots \\ X \end{bmatrix} \} a \text{ times repetition of } IFFT(x) \quad \text{[Equation 3]}$$

Figure 7:
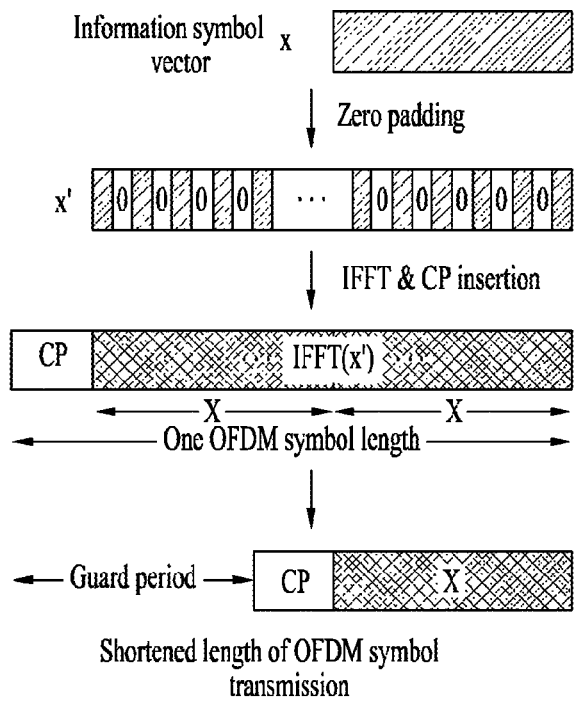
FIGS. 7 to 10 illustrate a discovery signal according to an embodiment of the present invention.
Figure 8:
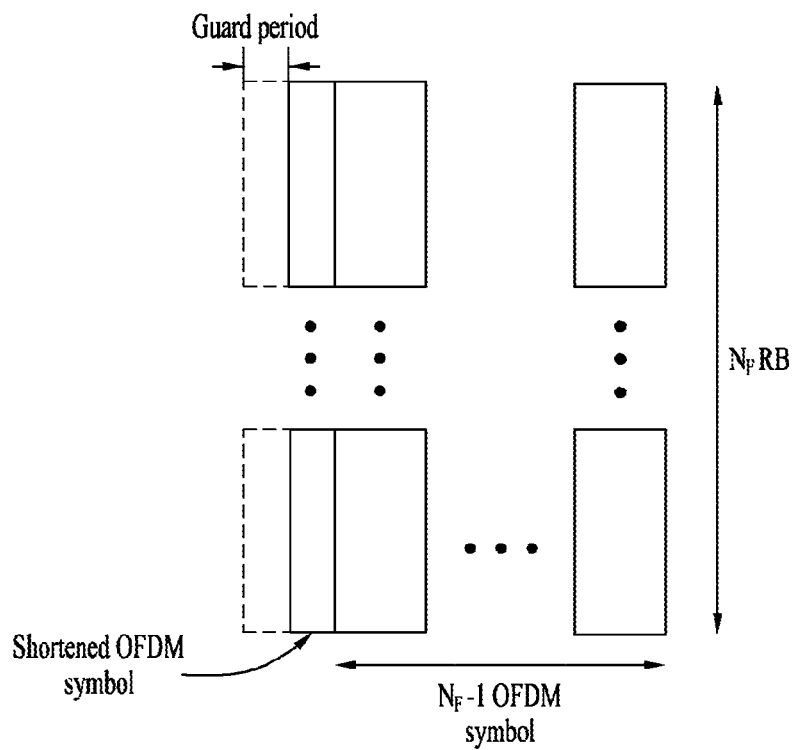

A part of the repeated sequence may not be transmitted but may be used as a guard period for Tx/Rx switching. A receiver may be aware that a part of the repeated sequence is not transmitted but used as a guard period, and recover the original symbol vector by repeatedly filling a received symbol vector in the guard period during demodulation or by using a smaller FFT size than an FFT size used for a normal OFDM symbol (by using an FFT of a different size in a shortened OFDM symbol). FIG. 7 illustrates an example in which a is 2. Referring to FIG. 7, 0 is inserted alternately with a symbol in a symbol vector X, and the zero-padded symbol vector is IFFT-processed. Then, an OFDM symbol composed of CP+X+X may be produced. CP+X out of CP+X+X is used as an OFDM symbol.

In another method, a larger subcarrier spacing than a legacy subcarrier spacing may be used. For example, if an OFDM subcarrier spacing is 15 KHz (in case of a normal CP) in a legacy LTE system and a subcarrier spacing (30 KHz) twice larger than the legacy OFDM subcarrier spacing is used, the OFDM symbol length is shortened to ½. This may be generalized to generation of an OFDM symbol of a length decreased by 1/a times (except for a CP) by use of a a-times larger subcarrier spacing (a is a natural number).

In the above description, the value of a may be related to the Tx/Rx switching delay of a UE. The network may determine a statistical capability value of each UE and signal a specific vale in advance by a physical-layer/higher-layer signal, or a predetermined value of a may be used. Such a shortened OFDM symbol may be used as the first OFDM symbol of a DS, thus providing a guard period to the DS. That is, if one DS occupies $N_T$ OFDM symbols in the time domain and $N_F$ RBs in the frequency domain, the first or last symbol of each DS may be set as a guard symbol for Tx/Rx switching. Herein, the guard symbol may be one OFDM symbol.

A UE ID (or cell ID)-based pseudo-random sequence may be used for the shortened guard symbol. For example, a Binary Phase Shift Keying (BPSK) Gold sequence of length 31 used for a Secondary Synchronization Signal (SSS) (or Quadrature Phase Shift Keying (QPSK) may be used to increase the capacity of a DS by reducing the number of used REs to a half) may be used. This is because if the first symbol is a shortened symbol, a known sequence may be used for Automatic Gain Control (AGC) stabilization or timing offset correction. A symbol region except for the guard symbol may be used as a data region of the DS. The data region may be a DS in the form of a sequence or a codeword produced by applying a Forward Error Correction (FEC) code to specific information. An example of a DS in the form of a pseudo-random sequence may be an SSS of a synchronization channel. A much larger number of IDs may be required for DSs than cells, and to increase the capacity of a DS, after each UE acquires rough time synchronization (e.g., within a CP) from the timing of a specific reference signal (from a DL or UL signal), a plurality of UEs are highly likely to transmit DSs in different frequency areas. Accordingly, since an operation for detecting rough time synchronization may be omitted, a much larger number of IDs than the number of cell IDs may be generated by combinations of a plurality of independent SSSs without a PSS.

To further generalize the above, if one DS includes $N_T$ OFDM symbols and $N_F$ RBs, a sequence generated from a different sequence generator may be used for each OFDM symbol (or a plurality of sequences may be multiplexed in one OFDM symbol, like an SSS). Or a sequence generated based on a different seed value from the same sequence generator may be used for each OFDM symbol. Or sequences generated from a pseudo-random sequence generator may be used for a part of the OFDM symbols, whereas FEC-applied codewords may be used for the remaining part of the OFDM symbols.

If a symbol having a shortened length for Tx/Rx switching is used as the first symbol (or the last symbol) of a DS as illustrated in FIG. 3, a pseudo-random sequence different from that of a full OFDM symbol may be used. The different pseudo-random sequence may be just a sequence of a shortened length generated from the same sequence generator or a sequence generated in a different pseudo-random sequence generation method. For example, a Constant Amplitude Zero Auto-Correlation (CAZAC) sequence may be used for a shortened symbol, and an M sequence may be used for a full OFDM symbol.

Figure 9:
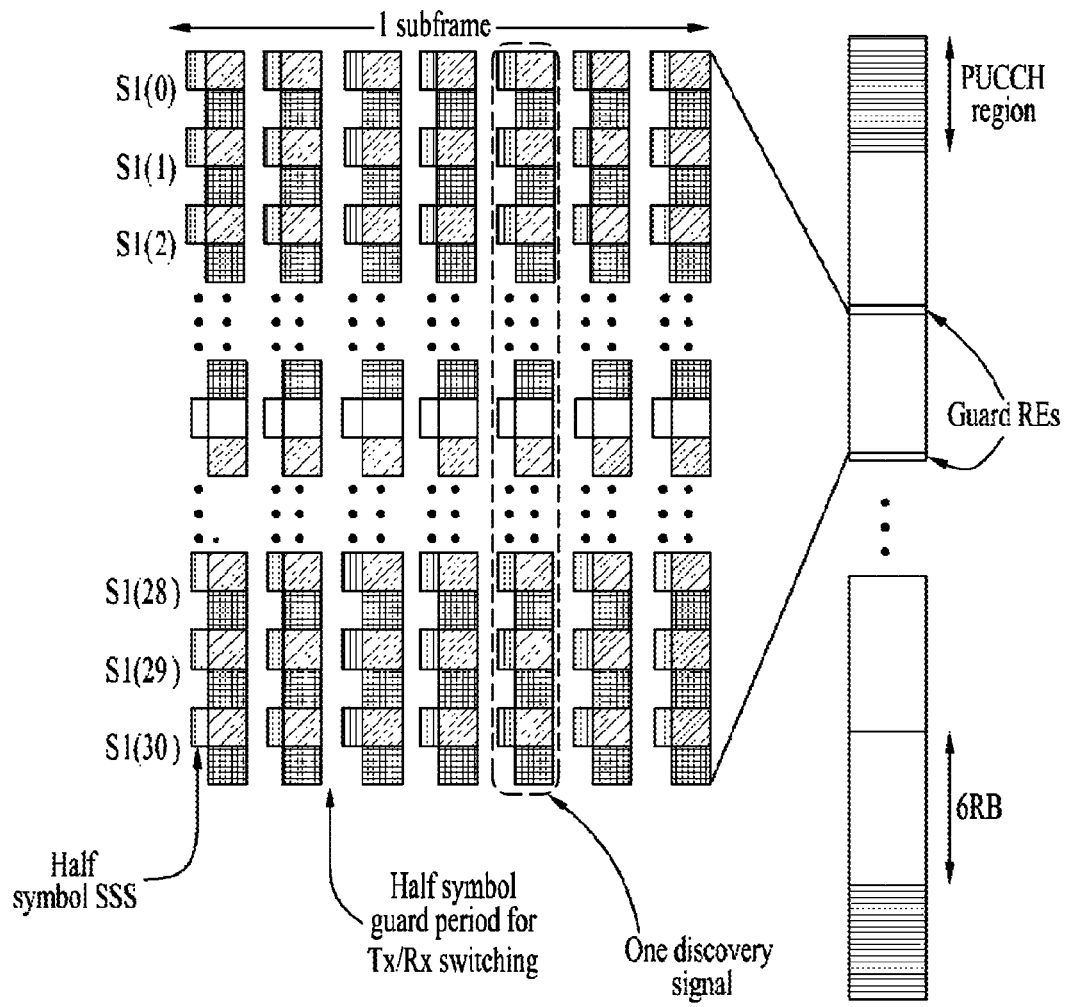

A pseudo-random sequence may be used for the shortened symbol, and FEC-applied codewords including a UE ID and specific information may be used for ($N_T$−1) OFDM symbols. An RS is required for an FEC-applied codeword, and the afore-described sequence of a shortened length may be used as a reference signal in the data region of the DS. If an independent pseudo-random sequence is used for each symbol, up to 168×168 IDs may be generated by concatenating SSSs during two symbols. If $N_T$=3, $N_F$=6, and the first symbol is a half symbol (a=2), a Gold sequence of length 31 (SSS1) among SSSs may be used for the first symbol. Herein, SSS1 may be hashed from a seed value different from that of an SSS used for one symbol. Since up to 31 IDs are distinguished from each other in SSS1, if even the half symbol is used to distinguish IDs, up to 874944 IDs (=31 (SSS1 for the first half OFDM symbol)×168 (SSSs for the second OFDM symbol)×168 (SSSs for the third OFDM symbol)) may be generated. FIG. 9 illustrates an exemplary subframe in which a DS is configured with a ½ OFDM symbol SSS and one OFDM symbol in combination.

Figure 10:
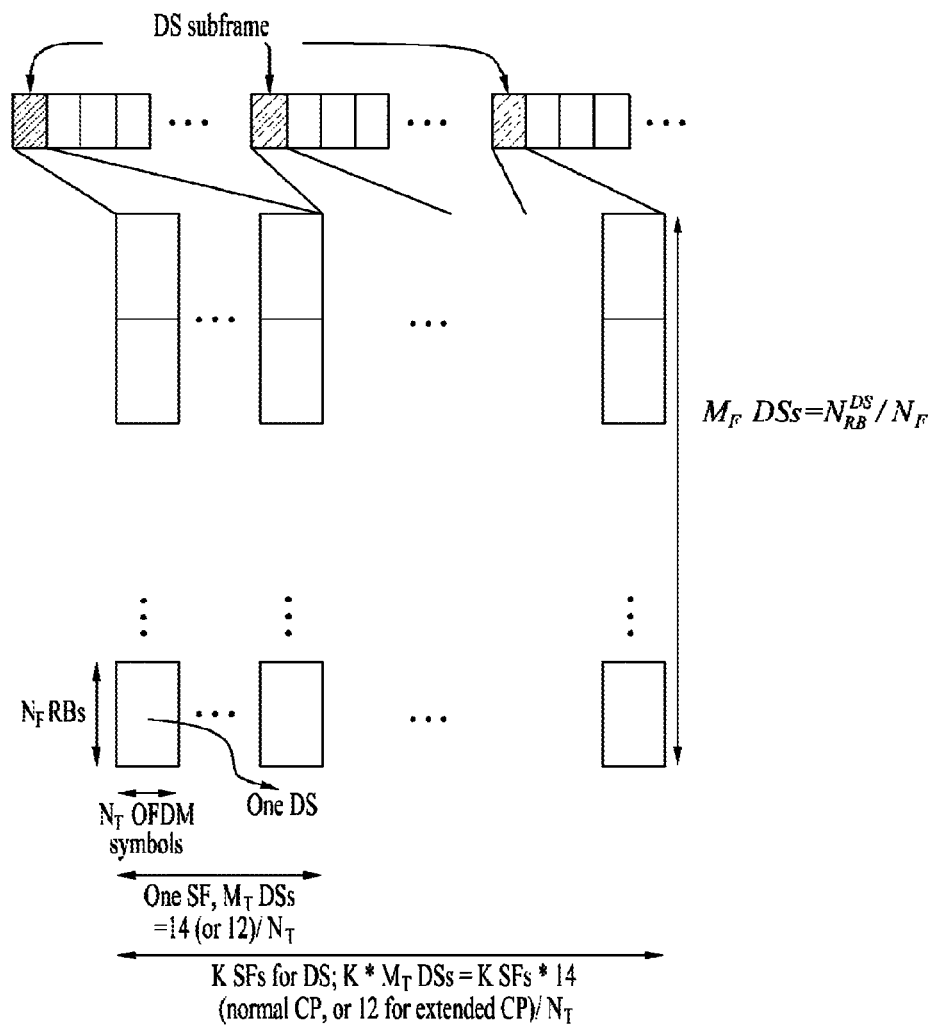

Although a legacy SSS is transmitted in the middle 6 RBs of a bandwidth, signal transmission is also possible in other RB regions than the middle 6 RBs in a DS. For example, in the case of DSs illustrated in FIG. 10, given 10 MHz in FDD, if $N_F$=6, a total of 7 (6RBs×7=42, except for 8 PUCCH RBs) DSs may be multiplexed.

A sequence in the shortened symbol may be transmitted with transmission power a times larger than the transmission power of a subsequent full OFDM symbol. Herein, the network may signal a by a higher-layer or physical-layer signal, or a may be a preset value. This is because a signal transmitted in the shortened symbol may be used for time or frequency synchronization correction, indication of a codeword type, or channel estimation of a DS and thus requires more transmission power. If a UE ID is indicated by a specific sequence combination, n IDs may be grouped and a specific UE may use one of n ID groups. With each ID of a group, a specific UE transmitting a DS may indicate discovery-related information. For example, the first of n sequences may be used to indicate the presence of data to be transmitted after discovery, and the following sequences may be used to indicate a service type, in/out of coverage, etc. Herein, n may be a predetermined value or indicated to the UE through a physical-layer or higher-layer signal by the network.

If a DS is transmitted twice or more times in adjacent subframes or within a subframe, Orthogonal Cover Codes (OCCs) may be applied to the DS. In this case, even though different UEs select the same sequence, they may be distinguished from each other. For example, the use of OCCs of length 2 may double the number of available IDs.

Configurations of Apparatuses According to Embodiment of the Present Invention

Figure 11:
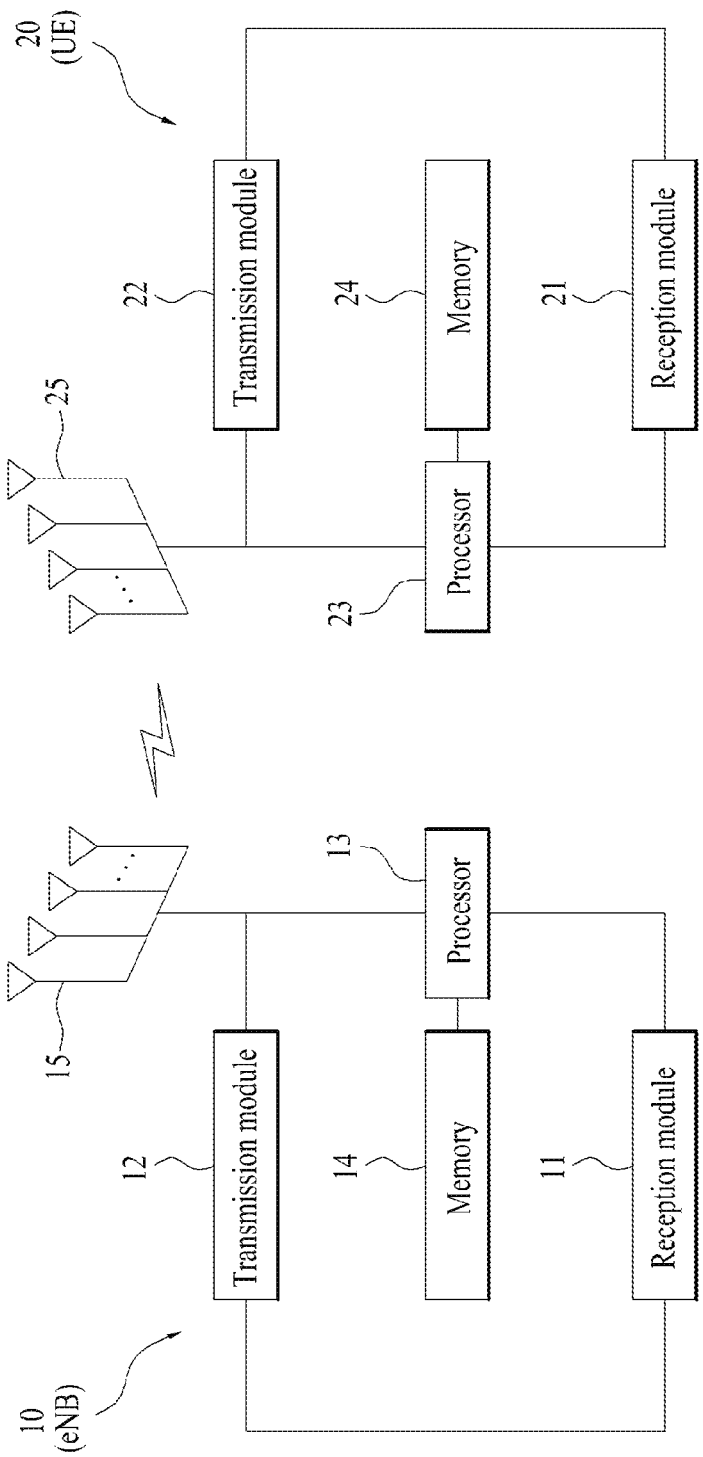
FIG. 11 is a block diagram of a transmission apparatus and a reception apparatus.

FIG. 11 is a block diagram of a transmission point and a UE according to an embodiment of the present invention.

Referring to FIG. 11, a transmission point 10 according to the present invention may include an Rx module 11, a Tx module 12, a processor 13, a memory 14, and a plurality of antennas 15. Use of the plurality of antennas 15 means that the transmission point 10 supports Multiple Input Multiple Output (MIMO) transmission and reception. The Rx module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 11 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 11 is applicable to a relay as a DL transmitter or a UL receiver, and the description of the UE 20 in FIG. 11 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

What is claimed is:

1. A method for mapping a discovery signal by a User Equipment (UE) in a wireless access system, the method comprising: generating the discovery signal; mapping the discovery signal to a resource element set for discovery; and mapping the resource element set for discovery to at least a part of a plurality of discovery signal Resource Blocks (RBs), wherein if the number of UEs transmitting and receiving discovery signals, including the UE, is equal to or less than a predetermined value, absolute values of frequency values within frequency bands of discovery signal RBs included in a positive frequency area with respect to a Direct Current (DC) carrier among the plurality of discovery signal RBs are not overlapped with absolute values of frequency values within frequency bands of discovery signal RBs included in a negative frequency area with respect to the DC carrier among the plurality of discovery signal RBs.

2. The method according to claim 1, wherein if a system bandwidth of the UE has an even number of RBs, the plurality of discovery signal RBs do not include two discovery signal RBs closest to the DC carrier.

3. The method according to claim 1, wherein if a system bandwidth of the UE has an odd number of RBs, the plurality of discovery signal RBs do not include a discovery signal RB including the DC carrier.

4. The method according to claim 1, wherein the plurality of discovery signal RBs do not include RBs for Physical Uplink Control Channel (PUCCH) transmission.

5. The method according to claim 4, wherein the RBs for PUCCH transmission include an RB to which a PUCCH is mapped and m (m>0) RBs adjacent to the RB to which the PUCCH is mapped.

6. The method according to claim 1, wherein two adjacent RBs included in the plurality of discovery signal RBs are apart from each other by l (l>0) RBs.

7. The method according to claim 1, wherein each of the plurality of discovery signal RBs includes n (n>0) RBs.

8. The method according to claim 1, wherein the plurality of discovery signal RBs exist only in a subframe configured for the UE.

9. The method according to claim 1, wherein if the number of UEs transmitting and receiving discovery signals, including the UE, is larger than the predetermined value, overlap is allowed.

10. The method according to claim 1, wherein the at least part of the plurality of discovery signal RBs corresponds to one of a plurality of discovery signal RB subsets configured for the UE.

11. The method according to claim 1, wherein a size of the resource element set for discovery is changed according to a system bandwidth of the UE.

12. The method according to claim 1, wherein a size of the resource element set for discovery is changed only when there are a predetermined number of resource element sets for discovery in a system bandwidth.

13. A User Equipment (UE) in a wireless access system, the comprising: a reception module; and a processor, wherein the processor is configured to generate a discovery signal, map the discovery signal to a resource element set for discovery, and map the resource element set for discovery to at least a part of a plurality of discovery signal Resource Blocks (RBs), and wherein if the number of UEs transmitting and receiving discovery signals, including the UE, is equal to or less than a predetermined value, absolute values of frequency values within frequency bands of discovery signal RBs included in a positive frequency area with respect to a Direct Current (DC) carrier among the plurality of discovery signal RBs are not overlapped with absolute values of frequency values within frequency bands of discovery signal RBs included in a negative frequency area with respect to the DC carrier among the plurality of discovery signal RBs.

* * * * *